Jan. 6, 1925.
H. D. ROCHEVILLE
1,521,905
VARIABLE CAMBER AEROPLANE WING
Filed July 19, 1923   2 Sheets-Sheet 1
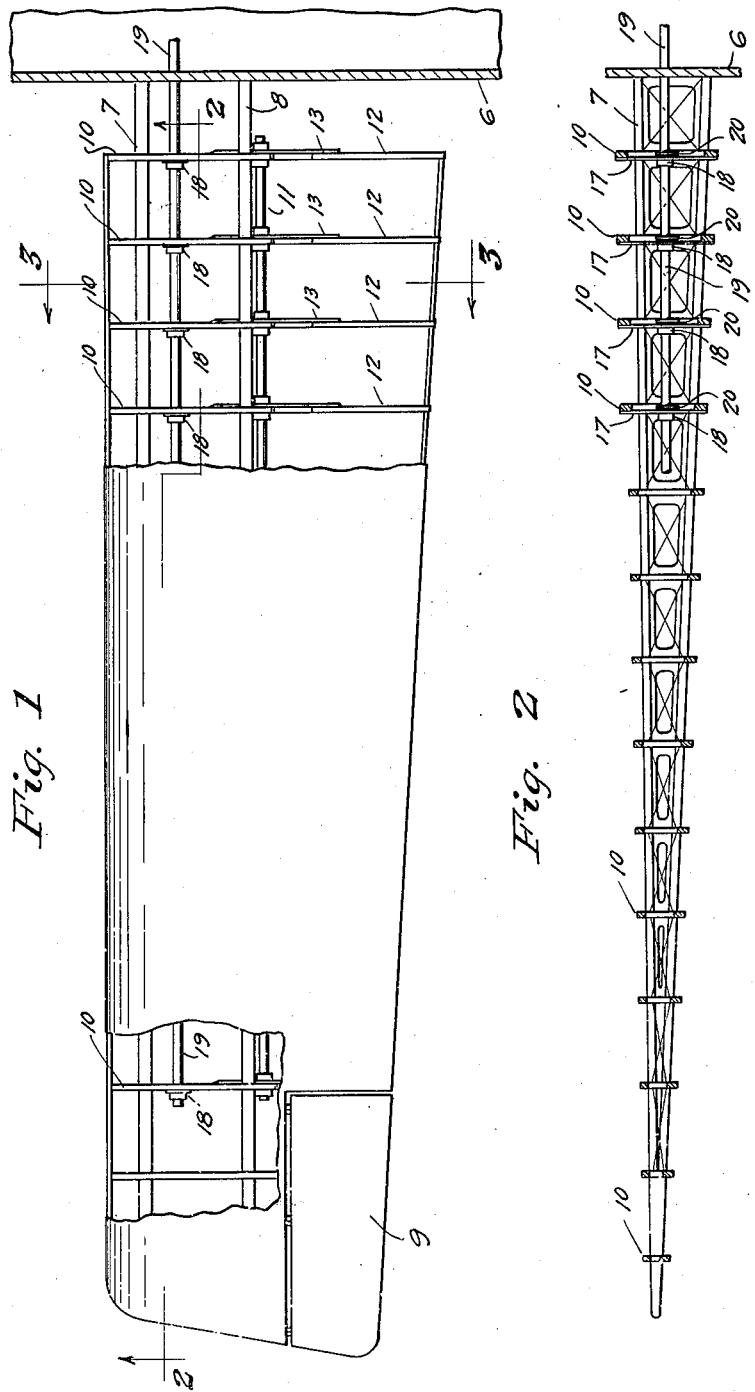
Inventor
Harry D. Rocheville
by Westall and Wallace
his Attorneys Jan. 6, 1925.  1,521,905

H. D. ROCHEVILLE

VARIABLE CAMBER AEROPLANE WING

Filed July 19, 1923  2 Sheets-Sheet 2

Inventor
Harry D. Rocheville
by Nestall and Wallace
his Attorneys

Patented Jan. 6, 1925.

1,521,905

UNITED STATES PATENT OFFICE.

HARRY D. ROCHEVILLE, OF LOS ANGELES, CALIFORNIA.

VARIABLE-CAMBER AEROPLANE WING.

Application filed July 19, 1923. Serial No. 652,538.

*To all whom it may concern:*

Be it known that I, HARRY D. ROCHEVILLE, a citizen of the United States, and resident of Los Angeles, in the county of Los Angeles and State of California, have invented certain new and useful Improvements in Variable-Camber Aeroplane Wings, of which the following is a specification.

This invention relates to planes, wings, or the like of aeroplanes of the variable camber type. The object of varying the camber of the wing is to vary its angle of incidence whereby its lifting power may be correspondingly varied. The advantages to be obtained by varying the camber are well known in the art. This invention pertains particularly to a wing so constructed that the angle of incidence of the rear or trailing portion of the wing may be varied. To this end, I provide a plane or wing having a forward or entering edge portion, which is maintained fixed with respect to the machine as a whole, and a trailing edge portion which may be tilted through an angle to vary the angle of incidence.

According to the present invention, the wing is constructed with an articulation between the entering edge and the trailing edge portion so that it may be flexed upwardly or downwardly. The primary object of this invention is to provide a structure whereby to require on the part of the operator a minimum of force to change the camber of the wing; and to provide details of construction whereby the objects above mentioned may be obtained.

Figure 3:
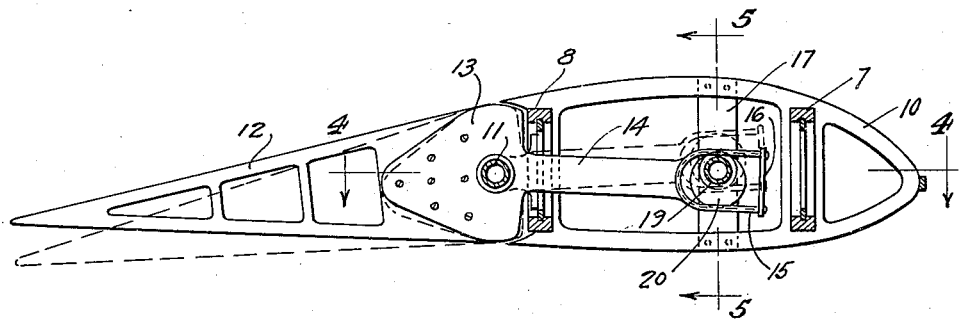
Figure 4:
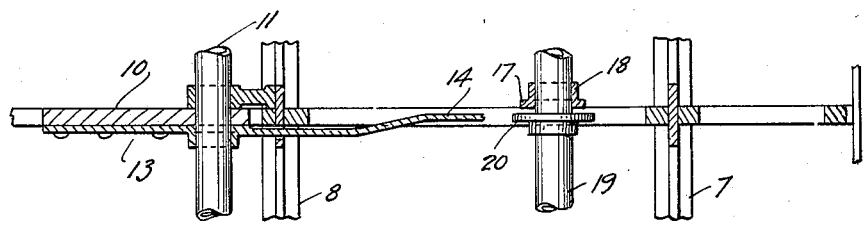
Figure 5:
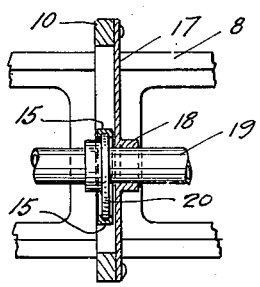

These objects together with other objects and corresponding accomplishments are obtained by means of the embodiment of my invention illustrated in the accompanying drawing, in which:

Fig. 1 is an elevation of a wing with a part of the covering broken away and a fragment of the fuselage shown in section; Fig. 2 is a section as seen on the line 2—2 of Fig. 1; Fig. 3 is a section as seen on the line 3—3 of Fig. 1; Fig. 4 is a fragmentary section on an enlarged scale as seen on the line 4—4 of Fig. 3; and Fig. 5 is a section as seen on the line 5—5 of Fig. 3.

Referring more particularly to the drawing, a fragment of the fuselage is indicated by 6. Spars 7 and 8 serve to support a wing. At the trailing edge of the wing is an aileron 9 to provide for transverse control. The features just described are those well known in the art and form no part of the present invention.

Mounted upon spars 7 and 8 are fixed ribs 10. These ribs are similar except for their contour and dimensions to conform with the change in shape of the wing from its inner to its outer end. The ribs 10 form the foundation for the entering edge of the wing. Extending through the fixed ribs adjacent their rear ends is a shaft 11. Aligned with the fixed ribs 10 are trailing edge ribs 12. These ribs are similar except for their outlines and dimensions which correspond with the change in shape of the wing from its inner to its outer end. Plates 13 are secured to the forward ends of the trailing edge ribs, as best shown in Figs. 3 and 4. The plates are preferably of metal, while the fixed ribs and trailing edge ribs may be of wood. The plates have forwardly extending arms 14 which are laterally offset as shown in Fig. 4, so as to be disposed within the faces of the fixed ribs and pass through openings in the spars 7 and 8. The forward ends of the arms are bifurcated and channelled as indicated by 15 to form straps, in which are disposed eccentric cams. The ends are closed by bars 16 best shown in Fig. 3.

Extending across the hollow portion of the fixed ribs 10 are bars 17 having bearings 18. Rotatably mounted in the bearings 18 is a shaft 19 which extends into the fuselage and may be connected to any suitable mechanism for turning the same. Fixed to the shaft 19 and disposed to ride in the straps of the several ribs are eccentrics 20. The eccentrics are aligned so that by turning the shaft the trailing edge ribs may have their angles correspondingly adjusted with respect to the wing as a whole, see Fig. 3.

The frame may be covered in any suitable manner. The usual material may be carried by the ribs and so arranged so as to permit rocking movement of the trailing edge ribs. It is obvious that various mechanical changes may be resorted to without departing from the invention.

What I claim is:

1. In an aeroplane, a wing having a fixed entering edge portion, and a trailing edge portion having ribs pivotally mounted in the entering edge portion, said ribs being provided with strap portions to receive eccentric cams, eccentric cams for each of said ribs, whereby to rock the same, and means to operate said cams.

2. In an aeroplane, a wing having a fixed entering edge portion, and a trailing edge portion having ribs pivotally mounted in the entering edge portion, forwardly extending arms connected to said ribs and having straps, cams for said straps to rock the same, and means to operate said cams.

3. In an aeroplane, a wing having a fixed entering edge portion, and a trailing edge portion having ribs pivotally mounted in the entering edge portion, said ribs being provided with arms having strap portions to receive cams, cams for each of said arms whereby to rock the same, and means to operate said cams.

4. In an aeroplane, a wing having a fixed entering edge portion, and a trailing edge portion having ribs pivotally mounted in the entering edge portion, said ribs being provided with forwardly extending arms having strap portions to receive cams, cams for each of said arms whereby to rock the same, and a shaft to which each of said cams is connected whereby to rotate said cams in unison.

In witness that I claim the foregoing I have hereunto subscribed my name this 10th day of July 1923.

HARRY D. ROCHEVILLE.